April 26, 1966 A. L. M. FETTWEIS 3,248,673

DOUBLE BALANCED TRANSISTOR MODULATORS

Filed April 4, 1963

Inventor
ALFRED L. M. FETTWEIS
By [signature]
Attorney

United States Patent Office 3,248,673

Patented Apr. 26, 1966

3,248,673

DOUBLE BALANCED TRANSISTOR MODULATORS

Alfred L. M. Fettweis, Antwerp, Belgium, assignor to International Standard Electric Corporation, New York, N.Y., a corporation of Delaware Filed Apr. 4, 1963, Ser. No. 270,746
Claims priority, application Netherlands, Apr. 9, 1962, 276,980
12 Claims. (Cl. 332—43)

The invention relates to double balanced transistor modulators using two transistors and a plurality of transformers to associate three pairs of terminals.

In general double balanced modulators, in which the input is alternately coupled to the output with and without phase reversal under the control of the carrier, offer not only the advantage of eliminating carrier lead, already afforded by ordinary balanced modulators of the series or shunt (Cowan) type, but also that of eliminating input leak. Moreover they enable a 6 decibel reduction of the attenuation. Using four rectifiers, the double balanced modulator has become well known in the ring modulator version. It is also known to realize double balanced modulators with transistors with the advantage that only two semi-conductor elements are needed and that considerably less carrier power is required.

Such double balanced transistor modulators are already known from the U.S. Patent No. 2,943,271. In this prior arrangement however, three transformers are used including a hybrid transformer associated with the pair of terminals to which the carrier wave may be applied. Such an arrangement is relatively complicated since, apart from the three-winding hybrid transformer used to supply the control signals to the modulator transistors from the carrier source, the other two transformers associated with the other two pairs of terminals, i.e. input and output, have three and five windings respectively. In the French Patent No. 1,242,790 apart from the hybrid transformer for the carrier wave, the other two involve three and four windings respectively but whereas the double balanced modulator of the U.S. Patent No. 2,943,271 is of the series type, the double balanced modulator of the French Patent No. 1,242,790 is of the bridged-T type. This configuration is unbalanced with respect to ground and presents the disadvantages that the two transformers other than that connected to the carrier wave terminals cannot be combined with those of the input and output filters and that these two transformers are not identical while the bandwidths may not be restricted to the required input and output bandwidths respectively.

Double balanced transistor modulators which do not require three relatively complicated transformers are known, e.g. from the U.S. Patent No. 3,010,079, but they necessitate the use of four transistors instead of two and in such a case while the advantage of transistor modulators requiring less carrier power than rectifier modulators is retained that of necessitating only two semi-conductor elements instead of four is lost.

The general object of the invention is to provide simpler double balanced modulators using two transistors and particularly double balanced modulators in which the number of transformers and of transformer windings is less than what is needed with the circuit of the U.S. Patent No. 2,943,271.

In accordance with a first characteristic of the invention, a double balanced transistor modulator using two transistors and a plurality of transformers to associate three pairs of terminals is characterized by the fact that it includes first and second identical transformers each including a first winding with a tapping point and a second winding, the second windings of the two transformers being serially interconnected in opposing phase relationship to a first pair of terminals, e.g. output, that the outer ends of said first windings are coupled through the emitter-collector path of a first and of a second transistor respectively, that a second pair of terminals, e.g. carrier, is coupled on the one hand between the base of said first transistor and the tapping point on the first transformer associated therewith and on the other hand between the base of said second transistor and the tapping point on the second transformer associated therewith, each of said couplings extending through a resistive branch decoupling said transistors from one another and that a third pair of terminals, e.g. input, is associated with said two transformers to enable signals appearing at said third pair of terminals to be modulated by carrier signals appearing at said second pair of terminals and, through said couplings, alternately rendering one of said two transistors conductive to short-circuit the associated transformer while the other transistor is blocked or vice-versa, thereby passing said input signals to said first pair of terminals alternatively with or without a phase reversal.

In this manner, a double balanced transistor modulator using only two transformers is obtained, one of these two transformers being effectively short-circuited by the conductive transistor switch whereby the input signals may be transmitted to the output by that transformer which is not short-circuited and with a suitable interconnection of the output windings of these two transformers, the input signals will thus appear at the output with or without a 180° phase modulation alternately produced at the frequency of the carrier wave signals. Not only is there the advantage with respect to the U.S. Patent No. 2,943,271, of using only two transformers, but these transformers may be of an identical design and none requires more than four windings. In addition to the first winding with a tapping point and a second winding inductively coupled to the two halves of the first, each of the two transformers will also require an additional winding inductively coupled to the others. These two additional windings for the two transformers will be serially connected between the input terminals. In this way, at the cost of an extra winding, the input signals may readily be coupled to the two transformers. This may however, be avoided.

In accordance with a second characteristic of the invention, the terminals forming said third pair, e.g. input, are connected to one outer end of said first winding in said first and said second transformers respectively with the tapping points of said two transformers directly interconnected.

No extra windings are then necessary to couple the input signals to the two transformers but the two transistor switches must still be controlled by the carrier wave in such a way that they are always in alternate conductivity states.

In accordance with a third charatceristic of the invention said directly interconnected tapping points constitute one terminal out of said second pair, while the other terminal out of said second pair is coupled to the bases of the transistors of opposite conductivity types, through a first and second resistance respectively.

Alternatively to the above, in accordance with a fourth characteristic of the invention, said second pair of terminals is coupled to the modulator through a hybrid coil with the outer ends of the hybrid coil winding which is provided with a tapping point connected to the base of the first and of the second transistor respectively, said transistors being of like conductivity type and said tapping point being coupled to the directly interconnected tapping points of said first and second transformers through a common resistance.

The special input windings on the two transformers may thus be dispensed with either by using switching transistors of opposite conductivity type or by connecting the carrier through a hybrid coil. It is true that this brings a third transformer into the circuit, but the latter brings at same time the particular advantage of the hybrid modulator which is known in itself from the Dutch Patent No. 65,649, namely, that of providing as blocking voltage to the transistor switch which must not be made conductive, not merely the full voltage which renders the other transistor switch conductive but in fact twice that voltage.

While in the above modulators of the invention the two transformers are identical, it is also possible to simplify the double balanced modulator known from the U.S. Patent No. 2,943,271 which uses different input and output transformers which may be designed differently.

In accordance with a fifth characteristic of the invention, a double balanced transistor modulator using two transistors and a plurality of transformers to associate three pairs of terminals including an input transformer with a separate winding connected to an input pair of terminals and an output transformer with a separate winding connected to an output pair of terminals is characterized by the fact, that said first transformer has a second and a third winding each with a separate tapping point and that said output transformer has two additional pairs of windings with the windings of each pair interconnected at one end through the emitter-collector path of a first and of a second transistor respectively and with the other ends of each of said pairs of windings respectively connected to the outer ends of said second and third windings on said input transformer in such a way that said connections are in phase opposition with one another, that each tapping point on said second or third winding is coupled to the base of the transistor which is not associated to this winding through a first and a second resistance respectively and that the last pair of terminals, e.g. carrier, is coupled to the bases of the transistors which are of like conductivity type so that the carrier wave alternately renders one or the other transistor conductive to effectively couple either said second or third winding with the corresponding pair of windings and transmit signals from said input to said output transformer alternately with or without a phase reversal.

In this way, the hybrid transformer necessitated for the carrier terminals by the arrangement of the U.S. Petent No. 2,943,271 need no longer be used while the two resistances will perform a decoupling action to prevent a short-circuit of the blocked transistor by the conductive one. Both the input and the output transformers each require five windings, but an alternative realization of the invention permits to reduce the number of windings.

In accordance with a sixth characteristic of the invention, a double balanced transistor modulator using two transistors and a plurality of transformers to associate three pairs of terminals including an input transformer with a separate winding connected to an input pair of terminals and an output transformer with a separate winding connected to an output pair of terminals is characterized by the fact, that said input transformer has a second winding with a midpoint tapping to which one terminal of the last pair of terminals, e.g. carrier, is connected, that said output transformer has two additional pairs of windings with the windings of each pair interconnected at one end through the emitter-collector path of a first and of a second transistor respectively, the other end of each of said pairs of windings being respectively connected to the outer ends of said second input transformer winding with each winding of each of said two pairs being directly connected to a winding of the other pair and that the second terminal of said last pair of terminals is coupled to the bases of the transistors, of opposite conductivity types, through a first and a second resistance respectively.

In this manner, by the use of transistors of opposite conductivity type the number of windings on the input transformer may be reduced to three.

The above and other objects and characteristics of the invention will be better understood from the following description of detailed embodiments thereof to be read in conjunction with the accompanying drawings which represent:

Figure 1:
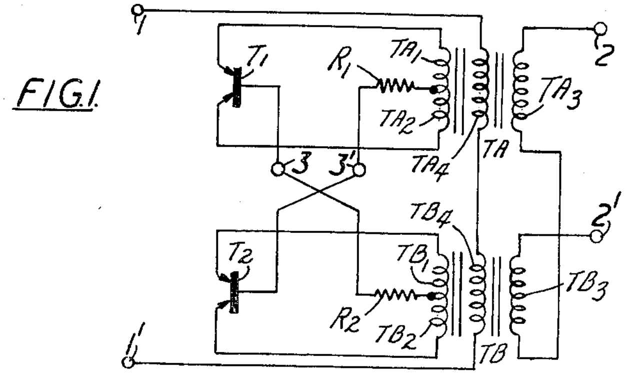
FIG. 1 is a schematic diagram of a first embodiment of the invention using two identical transformers each with four windings.

Referring to FIG. 1, the latter shows a first embodiment of the invention representing a double balanced modulator, i.e. a modulator using the phase inverter principle, in which only two transformers TA and TB are necessary, each transformer being provided with four windings. Windings $TA_1$ and $TA_2$ are directly interconnected at one of their ends while their outer ends are coupled through the emitter-emitter path of a symmetrical PNP junction transistor $T_1$. The windings $TB_1$ and $TB_2$ with an equal number of turns, directly interconnected at one of their ends, have their outer ends similarly interconnected by way of transistor $T_2$ which is identical to $T_1$. The input terminals 1–1′ are interconnected through the windings $TA_4$ and $TB_4$ in series while the output terminals 2–2′ are likewise interconnected through the windings $TA_3$ and $TB_3$ in series but this time with the two windings in opposing phase relationship. Finally, terminal 3 is directly connected to the base of $T_1$ and also to the junction point of $TB_1$ and $TB_2$ through resistance $R_2$, while terminal 3′ is likewise directly connected to the base of $T_2$ and to the junction point of $TA_1$ and $TA_2$ through resistance $R_1$.

In this manner, depending on the polarity of the carrier wave signal applied at terminals 3–3′, either transistor $T_1$ or transistor $T_2$ will be conductive while the other transistor will be blocked and a short-circuit will thus be applied either to transformer TA or to transformer TB. This will result in the input signal at terminals 1–1′ being transmitted to the output terminals 2–2′ with or without a 180° phase reversal in view of the way in which $TA_3$ and $TB_3$ are serially interconnected. When terminal 3′ for instance is more positive than terminal 3, $T_1$ is conductive, the current flowing from 3′ through $R_1$ and in equal halves through $TA_1$ and $TA_2$ and then through the emitter-base junctions of $T_1$ back to 3. Due to the series resistance $R_1$, this conductive transistor cannot directly short-circuit the carrier wave terminals 3–3′ whereby the full carrier voltage between these two terminals with 3′ more positive than 3 remains available as blocking voltage between the base of the PNP transistor $T_2$ and the two windings $TB_1$ and $TB_2$ leading to the two emitters of $T_2$.

Figure 2:
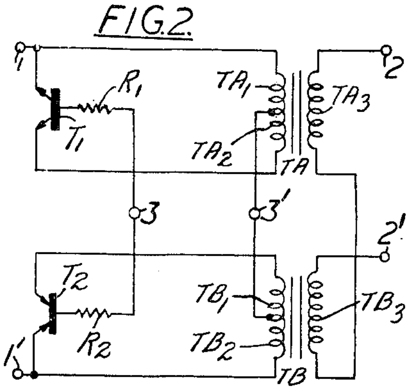
FIG. 2 is a schematic diagram of a second embodiment of the invention in which the number of windings of the like transformers has been reduced to three by using transistors of opposite conductivity type.

FIG. 2 shows that even simpler transformers may be used for TA and TB provided transistors of opposite conductivity types are used. In this case, FIG. 2 shows that windings $TA_4$ and $TB_4$ may be dispensed with, the upper end of winding $TA_1$ and the lower end of winding $TB_2$ now constituting the input terminals 1 and 1′ respectively and terminal 3′ being directly connected to the commoned junction points of $TA_1/Ta_2$ and $TB_1/TB_2$. Transistor $T_1$ is now NPN transistor while transistor $T_2$ remains of the PNP type, but the decoupling resistances $R_1$ and $R_2$ are now both connected to terminal 3 with their other ends connected to the bases of $T_1$ and $T_2$ respectively.

This time, when the potential at terminal 3' for instance is more positive than that at terminal 3, transistor $T_2$ will be conductive while transistor $T_1$ will be blocked as it is an NPN transistor.

Figure 3:
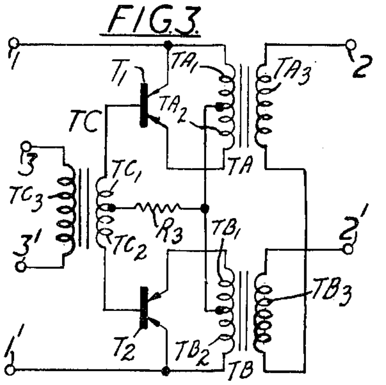
FIG. 3 is a schematic diagram of a third embodiment of the invention similar to that of FIG. 2, but in which transistors of like conductivity type are retained as in FIG. 1, due to the use of the hybrid modulator principle.

FIG. 3 shows that the fourth windings on transformers TA and TB can also be suppressed while keeping the two transformers of the same type provided a hybrid transformer is introduced at terminals 3–3'. On FIG. 3 the windings $TA_3$ and $TB_3$ are interconnected as previously while the windings $TA_1/TA_2$ and $TB_1/TB_2$ are interconnected in the same manner as in FIG. 2 but the bases of the two PNP transistors $T_1$ and $T_2$ are now coupled to terminals 3–3' through the series windings $TC_1$ and $TC_2$ of the hybrid transformer TC, winding $TC_3$ being connected between terminals 3 and 3' while the junction point of windings $TC_1$ and $TC_2$ is connected to the junction point of the four windings $TA_1/TA_2$ and $TB_1/TB_2$ through resistance $R_3$.

In the case of the arrangement of FIG. 3, the hybrid transformer TC introduces the additional advantage that twice the voltage is now available for blocking the non-conductive transistor. Indeed, if it is assumed for instance that the potential at the lower end of winding $TC_2$ is negative while it is positive at the upper end of winding $TC_1$, the PNP transistor $T_2$ will be conductive and accordingly substantially the same voltage as that across winding $TC_2$ will be found across the common resistance $R_3$ and this voltage will therefore be added to the voltage across winding $TC_1$ to constitute a blocking bias voltage for the PNP transistor $T_1$. With an equal number of turns for the windings $TC_1$ and $TC_2$ this blocking voltage will thus be equal to twice the voltage across each of these two windings.

While the double balanced transistor modulators of the previous figures were of the shunt type using two like transformers TA and TB, it is also possible to simplify the two transistor double balanced modulators of the series type down to two transformers only, a hybrid transformer for terminals 3–3' being avoided.

Figure 4:
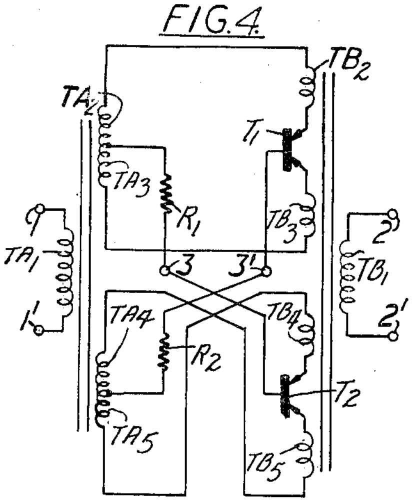
FIG. 4 is a schematic diagram of a fourth embodiment of the invention using an input and an output transformer each with five windings.

FIG. 4 shows a first realization in which terminals 1 and 1' are connected across winding $TA_1$ of a five-winding input transformer TA. The like windings $TA_2$ and $TA_3$ are interconnected at one end, while their outer ends are interconnected through the like windings $TB_2$ and $TB_3$ of the output transformer TB, the inner ends of these two windings $TB_2$ and $TB_3$ being connected to the emitters of the symmetrical PNP junction transistor $T_1$. The junction point of windings $TA_2$ and $TA_3$ is connected to terminal 3 through resistance $R_1$ while the base of $T_1$ is directly connected to terminal 3'. The winding $TB_1$ constitutes the output winding of transformer TB and it is directly connected to terminals 2—2'. The windings $TA_4/TA_5$ and the like windings $TB_4/TB_5$ are interconnected in the same way as $TA_2/TA_3$ and $TB_2/TB_3$ but with a crossing of the wires as shown to introduce the required phase reversal for the second path of this series phase inverter modulator, PNP transistor $T_2$ interconnecting $TB_4$ and $TB_5$ with the base of this transistor directly connected to terminal 3 and terminal 3' connected to the junction point of $TA_4$ and $TA_5$ through resistance $R_2$.

In operation, either $T_1$ or $T_2$ will be conductive while the other will be blocked depending on the polarity of the carrier voltage at terminals 3–3' and the decoupling resistances $R_1$ and $R_2$ will play the same role as those shown in FIGS. 1 and 2.

Figure 5:
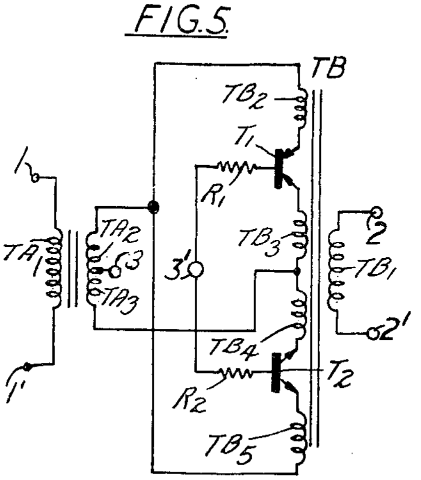
FIG. 5 is a schematic diagram of a fifth embodiment of the invention using an input and an output transformer as in FIG. 4 but with the number of windings on the input transformer reduced to three.

FIG. 5 shows that by using transistors of opposite conductivity types, as in FIG. 3, it is possible to simplify the phase inverter series modulator of FIG. 4 by limiting the number of windings of the input transformer TA to three windings only, output transformer TB keeping its five windings. The winding $TA_1$ is connected directly across terminals 1–1' and the common point of windings $TA_2$ and $TA_3$ constitutes terminal 3 while the outer ends of windings $TA_2$ and $TA_3$ are respectively connected to the upper end of winding $TB_2$ as well as to the lower end of winding $TB_5$, and to the junction point of windings $TB_3$ and $TB_4$. The like windings $TB_2$ and $TB_3$ are interconnected through the emitter-emitter path of the symmetrical PNP junction transistor $T_1$, while the like windings $TB_4$ and $TB_5$ are interconnected by the emitter-emitter path of the symmetrical NPN junction transistor $T_2$. Terminal 3' is connected to the bases of $T_1$ and $T_2$ through the individual decoupling resistances $R_1$ and $R_2$ which play the same role as before. As in FIG. 4, terminals 2–2' are directly connected to the winding $TB_1$.

In operation, when the carrier wave potential 3 is more poistive than that at 3', PNP transistor $T_1$ will be conductive as in FIG. 4, and though transistor $T_2$ receives the same phase of carrier signal as transistor $T_1$, since $T_2$ is of the NPN type it will be blocked at that moment. For the opposite condition of the carrier wave signal at terminal 3–3', $T_2$ will be conductive and $T_1$ will be blocked whereby as in all embodiments shown, the input signals across terminals 1–1' will be alternately transmitted to the output terminals 2–2' with or without a phase reversal of 180° depending on which of the two transistors $T_1$ or $T_2$ is conductive.

While in all the embodiments shown it has been assumed that the two transistors were symmetrical transistors, the invention is not necessarily limited to the use of such transistors and ordinary asymmetrical transistors may also be used. For instance, in case of the embodiment of FIG. 2, $T_1$ might be an ordinary NPN transistor with its emitter connected to terminal 1 and its collector to the lower end of $TA_2$, while $T_2$ could be a matched ordinary PNP transistor with its emitter connected to terminal 1' and its collector connected to the upper end of winding $TB_1$. Also, while in the described embodiment it has been assumed that the pairs of directly connected windings such as $TA_1$ and $TA_2$ in FIGS. 1, 2 and 3, had an equal number of turns, this should not be considered as a limitation of the invention since if ordinary asymmetrical transistors are used for $T_1$ and $T_2$, it would be appropriate to have a different number of turns for such windings as $TA_1$ and $TA_2$, as described in the French Patent No. 1,242,790 with the number of turns depending upon the asymmetry of the transistor used.

While the invention is particularly applicable to carrier wave transmission systems it is clear that the modulator circuits disclosed may have other applications, e.g. keying circuits.

While the principles of the invention have been described above in connection with specific apparatus, it is to be clearly understood that this description is made only by way of example and not as a limitation on the scope of the invention.

What is claimed is:

1. A double balanced transistor modulator comprising:

a first transformer including a first winding, a second winding, a third winding, a fourth winding, and a fifth winding;

a first transistor having its collector-emitter path coupled between one end of said first winding and one end of said second winding;

a second transistor having its collector-emitter path coupled between one end of said third winding and one end of said fourth winding;

first means coupling an input signal to the other ends of said first, second, third and fourth windings;

output means coupled to said fifth winding to provide an output signal; and second means coupling a carrier signal to the bases of both said first and second transistors to control the conduction thereof alternately to couple said input signal to said output means with alternate phase coincidence and phase reversal with respect to the phase of said input signal.

2. A modulator according to claim 1, wherein said first and second transistors are each symmetrical transistors.

3. A modulator according to claim 1, wherein said first and second transistors are each symmetrical transistors of the same conductivity type.

4. A modulator according to claim 1, wherein said first transistor is a symmetrical transistor of one conductivity type and said second transistor is a symmetrical transistor of a conductivity type opposite said one conductivity type.

5. A modulator according to claim 1, wherein said first means includes a second transformer having a sixth winding, a seventh winding, and an eighth winding inductively coupling said input signal to said sixth and seventh windings:

first conductor means coupling one end of said sixth winding to said other end of said first winding;

second conductor means coupling the other end of said sixth winding to said other end of said second winding;

third conductor means coupling one end of said seventh winding to said other end of said third winding; and fourth conductor means coupling the other end of said seventh winding to said other end of said fourth winding.

6. A modulator according to claim 1, wherein said first means includes a second transformer having a sixth winding and a seventh winding inductively coupling said input signal to said sixth winding;

first conductor means coupling said other end of said second winding to said other end of said third winding;

second conductor means coupling one end of said sixth winding to said other end of said first and fourth windings; and third conductor means coupling the other end of said sixth winding to said first conductor means.

7. A modulator according to claim 1, wherein said second means includes a first resistor coupled between said base of said first transistor and said first means;

a second resistor coupled between said base of said second transistor and said first means; and said carrier signal is coupled between the junction of said first resistor and said base of said first transistor and the junction of said second resistor and said base of said second transistor.

8. A modulator according to claim 1, wherein said second means includes a first resistor having one end thereof coupled to said base of said first transistor;

a second resistor having one end thereof coupled to said base of said second transistor;

conductor means coupling together the other end of said first resistor and the other end of said second resistor; and said carrier signal is coupled between said conductor means and said first means.

9. A modulator according to claim 1, wherein said first means includes a second transformer including a sixth winding having a first center tap, a seventh winding having a second center tap, and an eighth winding inductively coupling said input signal to said sixth and seventh windings;

first conductor means coupling one end of said sixth winding to said other end of said first winding;

a second conductor means coupling the other end of said sixth winding to said other end of said second winding;

third conductor means coupling one end of said seventh winding to said other end of said third winding; and fourth conductor means coupling the other end of said seventh winding to said other end of said fourth winding;

said second means includes a first resistor coupled between said base of said second transistor and said first center tap;

a second resistor coupled between said base of said first transistor and said second center tap; and said carrier signal is coupled between said base of said first transistor and said base of said second transistor; and said first and second transistors are each symmetrical transistors of the same conductivity type.

10. A modulator according to claim 1, wherein said first means includes a second transformer including a sixth winding having a center tap and a seventh winding inductively coupling said input signal to said sixth winding;

first conductor means coupling said other end of said second winding to said other end of said third winding;

second conductor means coupling one end of said sixth winding to said other end of said first and fourth windings; and third conductor means coupling the other end of said sixth winding to said first conductor means;

said second means includes a first resistor having one end thereof coupled to said base of said first transistor;

a second resistor having one end thereof coupled to said base of said second transistor;

fourth conductor means coupling together the other end of said first resistor and the other end of said second resistor; and said carrier signal is coupled between said fourth conductor means and said center tap;

said first transistor is a symmetrical transistor of one conductivity type; and said second transistor is a symmetrical transistor of a conductivity type opposite to said one conductivity type.

11. A modulator according to claim 7, wherein said first and second transistors are each symmetrical transistors of the same conductivity type.

12. A modulator according to claim 8, wherein said first transistor is a symmetrical transistor of one conductivity type and said second transistor is a symmetrical transistor of a conductivity type opposite said one conductivity type.

References Cited by the Examiner

UNITED STATES PATENTS

| | | | |
|---|---|---|---|
| 2,832,051 | 4/1958 | Raisbeck. | |
| 3,044,025 | 7/1962 | McCauley. | |
| 3,122,715 | 2/1964 | Buck | 332—43 |

HERMAN KARL SAALBACH, *Primary Examiner.*

ALFRED L. BRODY, ELI LIEBERMAN, *Examiners.*

P. L. GENSLER, *Assistant Examiner.*